United States Patent
Michelsen

(10) Patent No.: US 8,826,230 B1
(45) Date of Patent: *Sep. 2, 2014

(54) GRAPHICAL MODEL FOR TEST CASE VIEWING, EDITING, AND REPORTING

(75) Inventor: John Joseph Michelsen, Irving, TX (US)

(73) Assignee: Interactive TKO, Inc., Plano, TX (US)

( * ) Notice: Subject to any disclaimer, the term of this patent is extended or adjusted under 35 U.S.C. 154(b) by 294 days.

This patent is subject to a terminal disclaimer.

(21) Appl. No.: 13/341,361

(22) Filed: Dec. 30, 2011

Related U.S. Application Data

(63) Continuation of application No. 11/328,509, filed on Jan. 9, 2006, now Pat. No. 8,117,591.

(60) Provisional application No. 60/642,005, filed on Jan. 7, 2005.

(51) Int. Cl.
*G06F 9/44* (2006.01)
*G06F 11/36* (2006.01)

(52) U.S. Cl.
CPC .. *G06F 8/34* (2013.01); *G06F 8/33* (2013.01); *G06F 11/3664* (2013.01)
USPC ............. 717/109; 717/113; 717/125

(58) Field of Classification Search
CPC ............ G06F 8/30; G06F 11/36; G06F 17/22
USPC .................. 717/104–113, 124–135
See application file for complete search history.

(56) References Cited

U.S. PATENT DOCUMENTS

| | | |
|---|---|---|
| 6,587,969 B1 | 7/2003 | Weinberg et al. |
| 6,668,371 B2 | 12/2003 | Hamilton et al. |
| 7,310,777 B2 | 12/2007 | Cirne |
| 7,392,507 B2 | 6/2008 | Kolawa et al. |
| 7,401,141 B2 | 7/2008 | Carusi et al. |
| 7,487,508 B2 | 2/2009 | Fu et al. |
| 8,117,591 B1 * | 2/2012 | Michelsen ............ 717/109 |
| 2003/0046663 A1 | 3/2003 | Rogers et al. |
| 2003/0163608 A1 | 8/2003 | Tiwary et al. |
| 2004/0123272 A1 | 6/2004 | Bailey et al. |
| 2004/0225919 A1 | 11/2004 | Reissman et al. |
| 2005/0223365 A1 | 10/2005 | Smith et al. |
| 2006/0048100 A1 | 3/2006 | Levy et al. |
| 2007/0169003 A1 | 7/2007 | Branda et al. |

OTHER PUBLICATIONS

LISA, 2.0 User's Guide, Interactive TKO, Feb. 27, 2003, pp. 1-130.
LISA, 2.0 Developer's Guide, Interactive TKO, Mar. 13, 2003, pp. 1-23.
OASIS, "ebXML Test Framework Draft Document—Version 0.91," Dec. 2002, The Organization for the Advancement of Structured Information Standards, 92 pages.

(Continued)

*Primary Examiner* — Ted T Vo
(74) *Attorney, Agent, or Firm* — Patent Capital Group

(57) ABSTRACT

Various techniques for interacting with a test case via a graphical model are disclosed. For example, one method involves displaying a first icon, which represents a first testing activity within a test case; displaying a second icon, which represents a second testing activity within the test case; and displaying a connector, which couples the first icon and the second icon. An assertion (e.g., against test results obtained by performing the first testing activity) is associated with the connector.

21 Claims, 7 Drawing Sheets

(56) References Cited

OTHER PUBLICATIONS

U.S. Appl. No. 60/642,005, filed Jan. 7, 2005 and entitled "Graphical Model for Test Case Viewing, Editing and Reporting," inventor John Joseph Michelsen.
U.S. Appl. No. 11/328,509, filed Jan. 9, 2006 and entitled "Graphical Model for Test Case Viewing, Editing and Reporting", Inventor John Joseph Michelsen.
Non-Final Office Action in U.S. Appl. No. 11/328,509 mailed on Mar. 16, 2010.
Response to Non-Final Office Action dated Mar. 169, 2010 in U.S. Appl. No. 11/328,509, filed Sep. 16, 2010.
Final Office Action in U.S. Appl. No. 11/328,509 mailed on Nov. 24, 2010.
Request for Continued Examination and Amendment in U.S. Appl. No. 11/328,509, filed Apr. 25, 2011.
Notice of Allowance in U.S. Appl. No. 11/328,509 mailed on Oct. 21, 2011.
U.S. Appl. No. 61/101,668, filed Sep. 30, 2008 and entitled "Modeling and Testing Interactions between Components of a Software System," inventor Camron D. Bromley, et al.
U.S. Appl. No. 12/570,554, filed Sep. 30, 2009 and entitled "Modeling and Testing Interactions between Components of a Software System", inventor John J. Michelsen, et al.
Non-Final Office Action in U.S. Appl. No. 12/570,554 mailed on Dec. 6, 2012.
Response to Non-Final Office Action dated Dec. 6, 2012 in U.S. Appl. No. 12/570,554, filed Mar. 6, 2013.
Final Office Action in U.S. Appl. No. 12/570,554 mailed on Apr. 11, 2013.
Request for Continued Examination and Amendment in U.S. Appl. No. 12/570,554, filed Jul. 11, 2013.
Non-Final Office Action in U.S. Appl. No. 12/570,554 mailed on Jan. 28, 2014.

* cited by examiner

GRAPHICAL MODEL FOR TEST CASE VIEWING, EDITING, AND REPORTING

This application is a continuation and claims the benefit of priority under 35 U.S.C. §120 of U.S. application Ser. No. 11/328,509, filed Jan. 9, 2006 and entitled "Graphical Model for Test Case Viewing, Editing and Reporting", naming John Joseph Michelsen as inventor, which in turn claims the benefit of priority to U.S. Provisional Application Ser. No. 60/642,005, entitled "Graphic Model for Test Case Viewing, Editing, and Reporting," filed on Jan. 7, 2005, naming John Joseph Michelsen as inventor. The disclosure of the prior Applications are considered part of and are incorporated by reference in the disclosure of this Application.

FIELD OF THE INVENTION

This invention relates to testing and, more particularly, to systems for editing and viewing test cases.

DESCRIPTION OF THE RELATED ART

Configuring and using an automated testing system is difficult, even for experienced users. Most commercial systems require the test developer to learn a complex scripting paradigm. These systems may also require that a substantial amount of test code be generated before a test can be conducted. Unfortunately, the resulting test code can be just as difficult to verify as the system under test.

In many situations, the people best suited to test the actual functionality of a system are not the people who actually produced the system. For example, a programmer can generate software that functions as the programmer intended, but does not actual satisfy a stated customer need. In this situation, the programmer's misunderstanding of the problem to be solved prevents the programmer from being able to adequately test the software. Accordingly, when testing software, it is often desirable for a non-programmer (e.g., a person involved in the business and/or quality assurance departments) to evaluate the software in order to see whether the software meets its intended needs. However, the difficulties that arise in testing may prevent non-programmers from being able to easily test the software. Accordingly, new testing techniques are desired.

BRIEF DESCRIPTION OF THE DRAWINGS

A more complete understanding of the present invention may be acquired by referring to the following description and the accompanying drawings, in which like reference numbers indicate like features.

Figure 1:
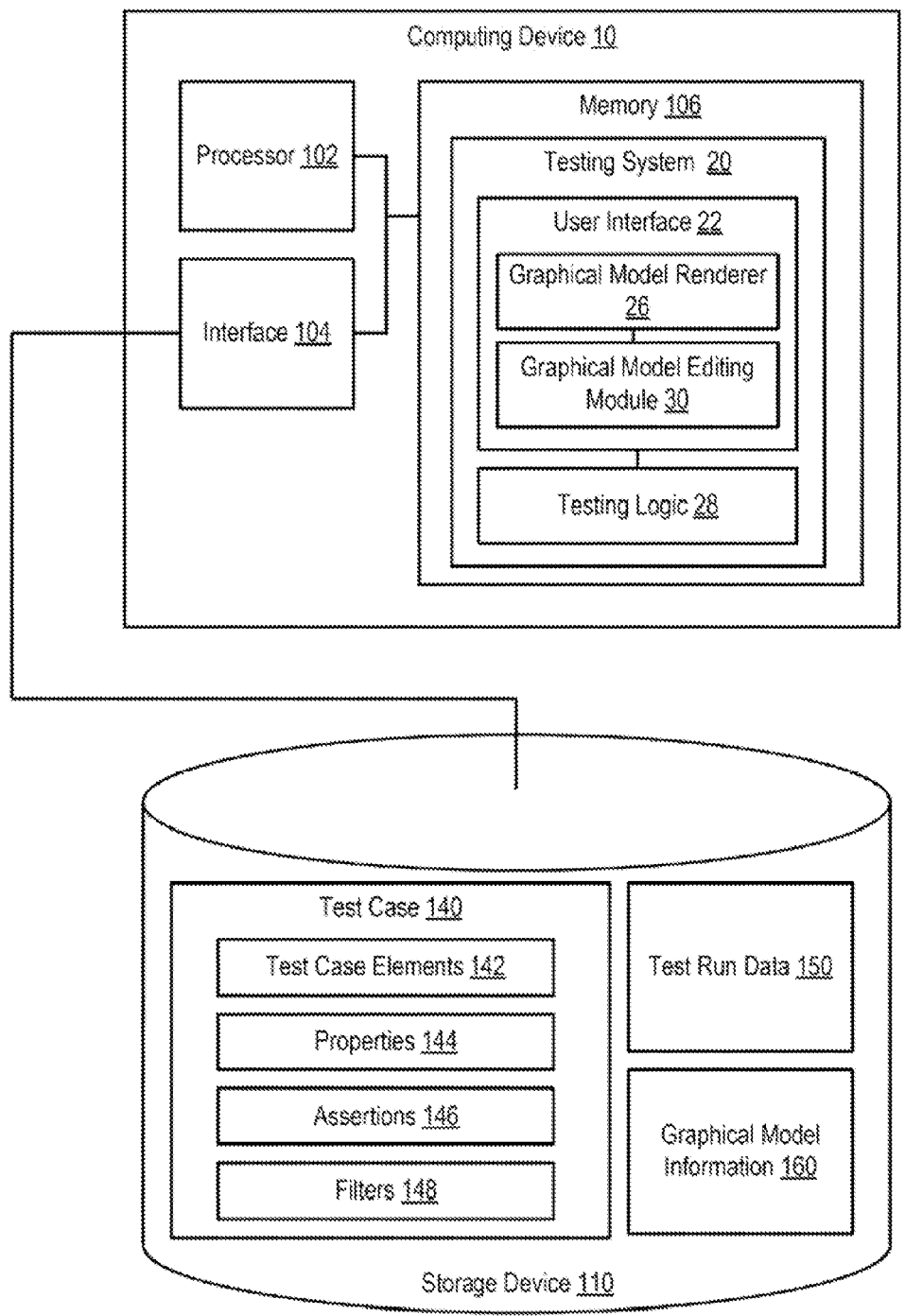
FIG. 1 is a block diagram of a testing system that can display a graphical model of a test case to a user, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a testing system that can display a graphical model of a test case to a user. Computing device 10 can be a personal computer, server, personal digital assistant, cell phone, laptop, workstation, or the like. As illustrated, computing device 10 implements a testing module 20. Testing module 20 is configured to display a graphical model of a test case to a user, and to allow the user to view, modify, and generate reports corresponding to the test case by interacting with the graphical model.

Computing device 10 includes one or more processors 102 (e.g., microprocessors, PLDs (Programmable Logic Devices), or ASICs (Application Specific Integrated Circuits)) configured to execute program instructions stored in memory 106. Computing device 10 can be a personal computer, server, personal digital assistant, cell phone, laptop, workstation, and the like. Memory 106 can include various types of RAM (Random Access Memory), ROM (Read Only Memory), Flash memory, MEMS (Micro Electro-Mechanical Systems) memory, and the like. Computing device 10 also includes one or more interfaces 104. Processor 102, memory 106, and interface 104 are coupled to send and receive data and control signals by a bus or other interconnect.

Interface 104 can include an interface to a storage device 110 on which the instructions and/or data included are stored. Interface 704 can also include an interface to a network for use in communicating other devices. Interface(s) 704 can also include interfaces to various peripheral Input/Output (I/O) devices, such as a monitor, on which a graphical model of a test case can be displayed.

In this example, program instructions and data implementing a testing module are stored in memory 106. Testing module 20 is a testing tool that is configured to test a system under test. In some embodiments, testing module 20 is a software tester. In some such embodiments, testing module 20 is an off-the-shelf testing tool (e.g., a software application available from a third-party vendor, as opposed to a testing tool that was completely designed in-house by the creators of the system under test). For example, in one embodiment, testing module 20 is LISA (Load-bearing Internet-based Simulator Application)™, available from iTKO, Inc. of Southlake, Tex. Testing module 20 can be a functional test tool (e.g., a test tool that is designed to verify whether the system under test is functioning as intended), a performance test tool (e.g., to measure how the system under test performs under certain conditions), or a test tool that gathers significant metrics describing the operation of the system under test.

Testing module 20 includes a user interface 22 and test logic 28. User interface 22 provides an interface to users, allowing users to create, modify, view, run, and evaluate test cases. Test logic 28 includes functionality needed to test a system using the test case created by a user. Test logic 28 includes functionality for interacting with the system under test as well as functionality (e.g., a workflow engine) for testing the system under test according to the test case.

Testing module 20 is configured to store information identifying a particular test as a test case. An example test case 140 is stored on storage device 110. Testing module 20 can store multiple test cases for the same system under test; however, for ease of explanation, only a single test case is shown in FIG. 1. Test case 140 includes the instructions and data that describe how to perform a particular test of a system under test. Test case 140 includes one or more elements 142, one or more properties 144, one or more assertions 146, and one or more filters 148. In one embodiment, a test case can include zero or more test case components such as nodes, zero or more properties, zero or more assertions, and/or zero or more filters. Other components can be included in a test case in addition to and/or instead of those mentioned above.

In one embodiment, test cases are stored in extensible markup language (XML) documents. A user can save a test case to a file for later editing, or when preparing to run the test. Test logic 28 can also save the result of executing all or part of the test case to a response document (e.g., test run data 150 can include one or more response documents). In one embodiment, test logic 28 creates and maintains response documents automatically, with no effort on the user's part.

Elements 142 can include one or more nodes. Each node is a test case component that represents one test action. The node includes the instructions needed to perform that action. For example, one node can include instructions and data needed to test performance of a database query, while another node includes instructions and data needed to test the display of the information returned from the query in a web page. Each node can information such as the name of the node, a description of the node, the type of the node, the time needed to execute the node, information identifying the next node to execute within the text case, and the like.

In one embodiment, testing module 20 is configured to test software systems and provides several different types of preconfigured nodes that can be used to test various types of software components. A user can insert nodes of the appropriate type into the test case and then customize the nodes (e.g., by configuring the node and/or configuring properties, filters, and/or assertions) to appropriately test a component within the system under test. Examples of different types of nodes include a node designed to load and execute a Java object, a node that is configured to complete a test and indicate that the test ended successfully, a failure node that is configured to complete a test and indicate that the test ended in failure, a node configured to interact with an instance of an Enterprise Java Bean (EJB) executing on a server, and/or a node configured to execute an external program such as a script or executable and capture its contents (e.g., the captured contents can be stored as properties that can subsequently be used to make assertions).

Additional types of nodes can include a node that is configured to generate a file system snapshot (e.g., in order to allow the test to verify that a file, directory, or directory tree adheres to a particular set of one or more assertions), a node that is configured to make web page requests (e.g., using Hypertext Transfer Protocol (HTTP)), a node that is configured to implement a script (e.g., written in Java), a node that is configured to send and/or receive messages (e.g., using Java Messaging Services), a node that is configured to print a text message to a log, and/or a node that is configured to acquire a reference to a remote Java object via remote method invocation (RMI) and then execute the remote Java object. Still other types of nodes can include a node configured to execute a Simple Object Access Protocol (SOAP) request (e.g., as specified in extensible markup language (XML)) against a web service, a node that is configured to read from a data stream (e.g., by reading a file, uniform resource locator (URL), classpath, or the like) and save the result, a node that is configured to use Java Database Connectivity (JDBC) to test database commands such as structured query language (SQL) statements and store procedures, a node that is configured to store the most recent response from a prior node execution as a property, and/or a node that is configured to acquire and execute a web service via the web services description language (WSDL) URL of the web service. Custom nodes can also be created to test other types of software components.

Each property included in properties 144 is a name-value pair. Properties can be used to store values that are being tested, expected test results, error conditions, and the like. Generally, a property includes a name and a value that is associated with that name. The value can include any type of value (e.g., a value calculated or determined by the system under test, a prespecified value provided by a user, state information associated with the system under test, an error message encountered when testing the system under test, and the like). Test logic 28 is configured to capture particular values and to store those values in appropriate properties. Test logic 28 can subsequently use the property as input to an assertion, as stimulus to another component under test, or to other test functionality, as specified in a test case.

Each filter 148 is a component that executes before and/or after a node executes, giving a user the ability to modify the data stored in a property before or after execution of a node. For example, a user can use a filter to store a particular value in a property. The stored value can then be compared to a value that was calculated during execution of the node in order to determine whether the component tested by the node operated successfully.

Each assertion 146 is a component that defines a condition that will vary the test case execution. For example, after performing test activity in a particular node, a user may wish to fail the test case if certain events occurred during the test activity. If those events did not occur, however, the user may wish for the test case to proceed to the next node. The user can achieve this behavior by specifying the next node as the default next node, while also setting up an assertion that will cause the test case to proceed to a failure node if the specified events occur. Thus, an assertion can be used to implement "if . . . then" functionality within a test case (e.g., an assertion can specify that: if event X occurs, the test case should proceed to node Y; otherwise the test case should proceed to the default next node). Typically, an assertion includes an operation (e.g., a comparison) that generates a boolean value (true or false). If that boolean value matches the boolean value specified in the assertion, the test case will proceed as specified in the assertion; otherwise, the test case will follow the default flow specified in the test case.

User interface 22 includes a graphical model renderer 26, which is configured to generate and display a graphical model of a test case to a user. User interface 22 also includes graphical model editing module 30, which is configured to provide a user with an interface to edit a test case by interacting with the graphical model. It is noted that a user can use a variety of input devices to interact with a graphical model, such as a mouse, keyboard, touch-screen, stylus, digital tablet, and the like.

Graphical model renderer 26 is configured to provide a user with the ability to view a graphical representation of a test case. A user can view the graphical model in order to discover which activities are included in the test case and/or the order in which included activities will be performed. The graphical model includes icons and/or other visual elements (referred to herein as "graphical elements") that represent components of the test case. For example, the graphical model can include an icon for each node included in test case elements 142. A different type of icon can be used for each type of node (e.g., start nodes can be represented by different icons than failure nodes or web request nodes). Interconnections between nodes can be used to represent assertions 146 or default next node values specified in nodes. Text fields or other adornments (e.g., highlighting, additional icons, and the like) can be used to indicate attributes or various other test case elements. For example, if a particular filter is applied to a node prior to execution of that node, the icon representing that node can have additional highlighting on the input side of the node to represent the filter.

In some embodiments, certain information within the test case, such as certain properties 144 and filters 148, may not be displayed in the graphical model. Thus, the graphical model can also provide a simplified view of the test case in which certain details are hidden. However, a user can access this information by selecting an icon or connection in the graphical model (e.g., by double-clicking or right-clicking on the icon or connector, or by highlighting the icon or connector and pressing "enter" or selecting an appropriate menu command). When the icon or connector is selected, user interface 22 can display more details about the associated node or assertion. For example, when a connector is selected, user interface 22 can display a window that shows the properties used by an assertion represented by the connector. Similarly, when a node is selected, user interface 22 can display a window that identifies the filters performed before and/or after execution of the node.

Graphical model renderer 26 renders a graphical model by reading test case 140 and determining which test case components, such as elements 142 and assertions 146, should be represented within the graphical model. In some embodiments, this is a straightforward process that involves adding an icon to the graphical model for each node included in elements 142 and a connector for each assertion 146 (in such embodiments, an intermediate model, as described below, may not be generated). In other embodiments, there may be a significant difference between the test case components and the eventual graphical model components. For example, there may not be a one-to-one correspondence between elements 142 and icons or between connectors and assertions 146. In these embodiments, graphical model renderer 26 can process the test case to generate graphical model information 160, which provides an intermediate test case model. Graphical model renderer 26 can then generate the graphical model from the intermediate test case model provided by graphical model information 160. It is noted that each instance of graphical model information 160 can correspond to a respective test case 140 (e.g., if there are multiple test cases, testing module 20 may also maintain multiple sets of graphical model information). Graphical model renderer 26 can also store information about user viewing preferences (e.g., a preferred layout, zoom, and the like) in graphical model information 160.

In some embodiments, icons within the graphical model can represent, among other types of nodes, nodes that implement a live interaction with an object (e.g., such nodes can implement the functionality described in U.S. patent application Ser. No. 11/328,423, entitled "System and Method for Live Software Object Interaction" and listing John Joseph Michelsen as an inventor, filed on Jan. 9, 2006), nodes, assertions, or filters that parse text buffers (e.g., such nodes can implement the functionality described in U.S. patent application Ser. No. 11/328,421, entitled "System and Method for Parsing a Text Buffer using a Graphical User Interface" and listing John Joseph Michelsen as an inventor, filed on Jan. 9, 2006), or nodes that are configured interact with instrumented code under test (e.g., such nodes can implement functionality described in U.S. patent application Ser. No. 11/328,510, entitled "Instrumentation System and Method for Testing Software" and listing John Joseph Michelsen as an inventor, filed on Jan. 9, 2006). These three patent applications are hereby incorporated by reference in their entirety, as if completely and fully set forth herein.

In some embodiments, graphical model renderer 26 can also be used to display a graphical model of a test case that has already been executed. In this situation, graphical model renderer 26 can access a test case 140 and test run data 150 generated when the test case was executed. The test run data 150 includes the results that were obtained when the test case was executed on the system under test. In this situation, the graphical model will show the actual flow of the test. For example, nodes that were not executed (e.g., such as the failure node, if the test was successful) can be omitted from the graphical model of the test run. In some embodiments, users can access details about the test run by selecting icons and connectors within the graphical model. In response to user selection of an icon or connector, user interface 22 can display, for example, a window that includes more details about the corresponding component (e.g., such as a node or assertion). This window can show actual results captured when the corresponding component was executed during the test run.

A user can also select particular components of a graphical model of a test case (or all components in a particular model) or test run and then select (e.g., via a menu provided by user interface 22) to generate a report corresponding to those components. User interface 22 can access the components of the underlying test case 140 that correspond to the selected graphical model components and provide the relevant information about those test case components to the user in the form of a report (e.g., as displayed in a window or printout).

In some embodiments, user interface 22 also allows the user to modify or create a test case by interacting with the graphical model. Graphical model editing module 30 provides this functionality (it is noted that this module can be omitted in embodiments in which users view, but do not edit, graphical models).

Graphical model editing module 30 detects changes to a graphical model and, in response to those changes, updates the underlying test case 140 and/or intermediate model (if any). For example, if the user deletes an icon within the graphical model of test case 140, graphical model editing module 30 will update elements 142 of test case to remove the element(s) that were represented by the deleted icons. Similarly, if a user reroutes a connection, which previously connected nodes A and B, so that the connection now connects node A to node C, graphical model editing module 30 can update elements 142 and/or assertions 146 to correspond to the new arrangement of the test case.

Thus, graphical model editing module 30 allows a user to make modifications to the test case flow and other attributes by moving, adding, and deleting graphical elements within the graphical model. For many users (especially non-programmer users), this method of editing a test case is more intuitive and less error prone than form-based or script-based test case editing techniques.

In some situations, instead of directly editing the graphical model, a user may select a particular graphical element within the graphical model for editing. In this situation, graphical model editing module 30 can launch an editing screen that corresponds to the specific graphical element selected. For example, if a user selects to edit an icon (e.g., by double-clicking on the icon), graphical model editing module 30 can launch a wizard, form-based entry screen, or other editing tool that can be used to edit the underlying test case elements corresponding to that icon.

In some embodiments, graphical model editing module 30 stores modifications to the underlying test case and/or test run data in a different location (e.g., on a different storage device, in a different file, or the like) than the original test case and/or test run. For example, graphical model editing module 30 can save a modified version (generated when a user modifies the graphical model) of a test case and/or test run as a new version, without overwriting the existing version.

Figure 2:
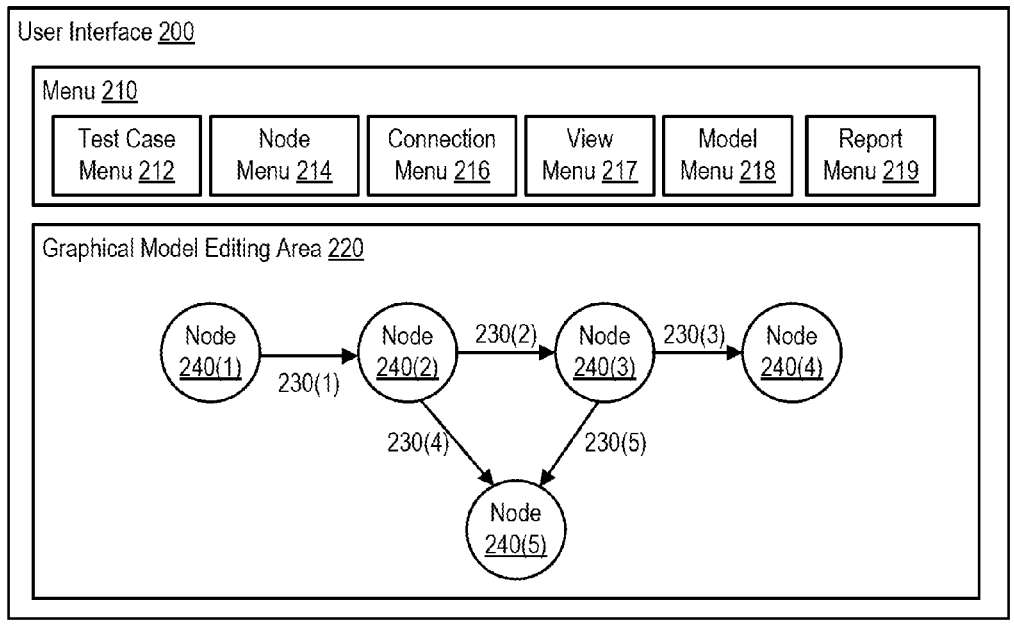
FIG. 2 is a block diagram of a user interface that includes a graphical model of a test case, according to one embodiment of the present invention.

FIG. 2 is a block diagram of an example user interface that includes a graphical model of a test case. User interface 200 includes a menu area 210 and a graphical model editing area 220. It is noted that in other embodiments, other areas can be shown instead of and/or in addition to those shown in FIG. 2. Additionally, in other embodiments, different elements can be displayed within each area instead of and/or in addition to those elements shown in FIG. 2.

When the graphical model of a test case is rendered, the graphical model will be displayed in graphical model editing area 220. If a user modifies the graphical model (e.g., by adding or deleting nodes), this area is updated to show the modified graphical model.

In this example, graphical model editing area 220 shows icons representing five nodes 240(1)-240(5). Each icon represents a node, which in turn corresponds to specific activity within the test case. The interconnections between nodes represent the order in which each node will be performed when the test case is executed.

Node 240(1) is the first node in the test. Node 240(1) can include the activity needed to initialize the test (e.g., by establishing communications with the system under test).

The orientation of connector 230(1) (with the arrow pointing to node 240(2)) indicates that, after node 240(1) is executed, node 240(2) will be executed. In this example, there is only one possible node to which the test case will proceed after executing node 240(1). Connector 230(1) can represent, for example, information within node 240(1) that specifies that the next node in the test case is node 240(2). Alternatively, connector 230(1) can represent an assertion that is configured to always be evaluated in the same way, regardless of what happens when node 240(1) is executed.

Node 240(2) is the second node of the test. After node 240(2) is executed, the test case can either proceed to node 240(3) (as indicated by connector 230(2)) or to node 240(5) (as indicated by connector 230(4)). In situations in which a node has several potential "next" nodes, at least one or more of the interconnections between that node and the potential next nodes represents an assertion. For example, in this situation, connector 230(2) can represent the information within node 240(2) that specifies that the default next node is node 240(3), while connector 230(4) can represent an assertion that, if evaluated in a certain way (e.g., true or false) during performance of the test, will cause the test case to proceed to node 240(5). Node 240(5) can represent, for example, a failure node, and connector 230(4) can represent an assertion that, if evaluated in a particular way, will cause the test to fail. As another example, connector 230(4) can represent information within node 240(2) identifying a default next node and connector 230(2) can represent an assertion.

It is noted that there can be multiple connections between the same set of nodes. For example, there can be two connectors between node 240(2) and node 240(3). If each connector represents a different assertion, each assertion will be evaluated before proceeding to the next node (e.g., if each assertion specifies a condition that must evaluate to "true," each of those conditions must be true before proceeding to node 240(3)). In alternative embodiments, a set of multiple assertions can be represented by a single connector in the graphical model. A user can select the connector in order to see which assertion(s) are associated with that connector.

If node 240(3) is executed, there are again two different ways in which the test case can proceed: to node 240(4) or to node 240(5), as indicated by connectors 230(3) and 230(5). Again, at least one of connectors 230(3) and 230(5) will represent an assertion. Node 240(4) can be a success node that is executed to indicate that the test ended in success.

A user can move the elements shown in graphical model editing area 220 from one location to another. A user can relocate the test case elements (e.g., the nodes and the interconnections between the nodes) on the screen to match the user's understanding and reporting needs. For example, a user may rearrange the physical locations of various nodes, without actually modifying the nodes or the interconnections between the nodes, in order to gain a better understanding of the relationship between the various test case elements. For example, without changing any interconnections, the user can rearrange the locations of the icons representing the nodes in order to obtain a more useful view of the test case.

Additionally, in some embodiments, a user can add or remove elements from the graphical model. For example, a user can delete node 240(3) and insert one or more replacement nodes. Similarly, a user can reroute connectors between nodes, or add new connectors. Existing connectors can also be deleted.

In response to modifications entered via graphical model editing area 220, the user interface will determine whether the underlying test case needs to be modified (e.g., if a user just moved icons, without changing interconnections, no changes will be made to the underlying test case). If so, the user interface will update the underlying test case (and/or any intermediate models used when rendering the graphical model) or create a new version of the underlying test case (e.g., in response to the user selecting "save" or "save as" after modifying the graphical model).

It is noted that, in at least some embodiments, a user can also create a new test case by entering graphical elements in graphical model editing area 220. In this situation, the user interface will generate a test case (and an intermediate model, if needed) based on the elements entered into graphical model editing area 220.

Menu 210 includes a variety of menus that a user can use to view, edit, and/or generate reports corresponding to the test case and/or test run represented by the graphical model in graphical model editing area 220. Each sub-menu (e.g., sub-menus 212-219) included in menu area 210 can include pull-down menu, set of icons, list of command keys, or some other visual selection means usable to select from a variety of options. If the user selects an option that affects the display of the graphical model (e.g., by changing the layout or zoom, or by modifying the graphical model), the user interface will update the graphical model and display the updated graphical model to the user.

Test case menu 212 is a menu that a user can use to open, close, create, delete, and/or save (e.g., using the same or a new test case name) a test case. If, for example, the user selects to open a test case via test menu 212, the user interface will read the test case and render a graphical model of the test case in graphical model editing area 220.

Node menu 214 is a menu containing options that correspond to nodes within the test case. For example, node menu 214 can include options for creating, deleting, or editing nodes. If a user selects to create a new node, the user interface can prompt the user to specify a node type. Once the user's response is received, the user interface will display a new icon that represents a node of the specified type within graphical model editing area 220. The user can move this node to the appropriate location within the graphical model and add appropriate connections to other nodes. When the user saves the test case, the user interface will update the underlying test case to include one or more elements corresponding to the new node.

Connection menu 216 includes options that a user can use to add, remove, or modify connections between icons shown in graphical model editing area 220. If a user modifies a connection in the graphical model and then saves the test case, the user interface can update the underlying test case to reflect the changes. For example, the user interface can update a node within the test case to specify a new default next node, if the user moved an existing connection. Similarly, if the user created a new connection, the user interface can create a new assertion within the test case to correspond to the added connection.

In some embodiments, when a user selects certain options (e.g., such as add or edit) from node menu 214 or connection menu 216, the user interface may temporarily display information in a non-graphical model format. For example, the user interface can display a form or wizard that will prompt the user for information useable to configure the new node or connection. After the user has finished entering information, the user interface can return to displaying the graphical model.

View menu 217 can include options that are useable to change how the graphical model is displayed within graphical model editing area 220. For example, view menu 217 can include options for zooming in and/or out of the graphical model, allowing users to either view the entire graphical model or to zoom in on particular portions of the graphical model. Additionally, view menu can include an option to fit the graphical model to screen. When selected, this option causes the graphical model to be scaled so that the entire model fits within graphical model editing area 220.

Other viewing options can control which information is displayed. For example, a user can select to hide failures. In this situation, the failure node (e.g., node 240(5) in FIG. 2) will be hidden, as will connectors (e.g., connectors 230(4) and 230(5)) leading to the failure node. This allows users to see the intended flow of the test case.

Figure 7:
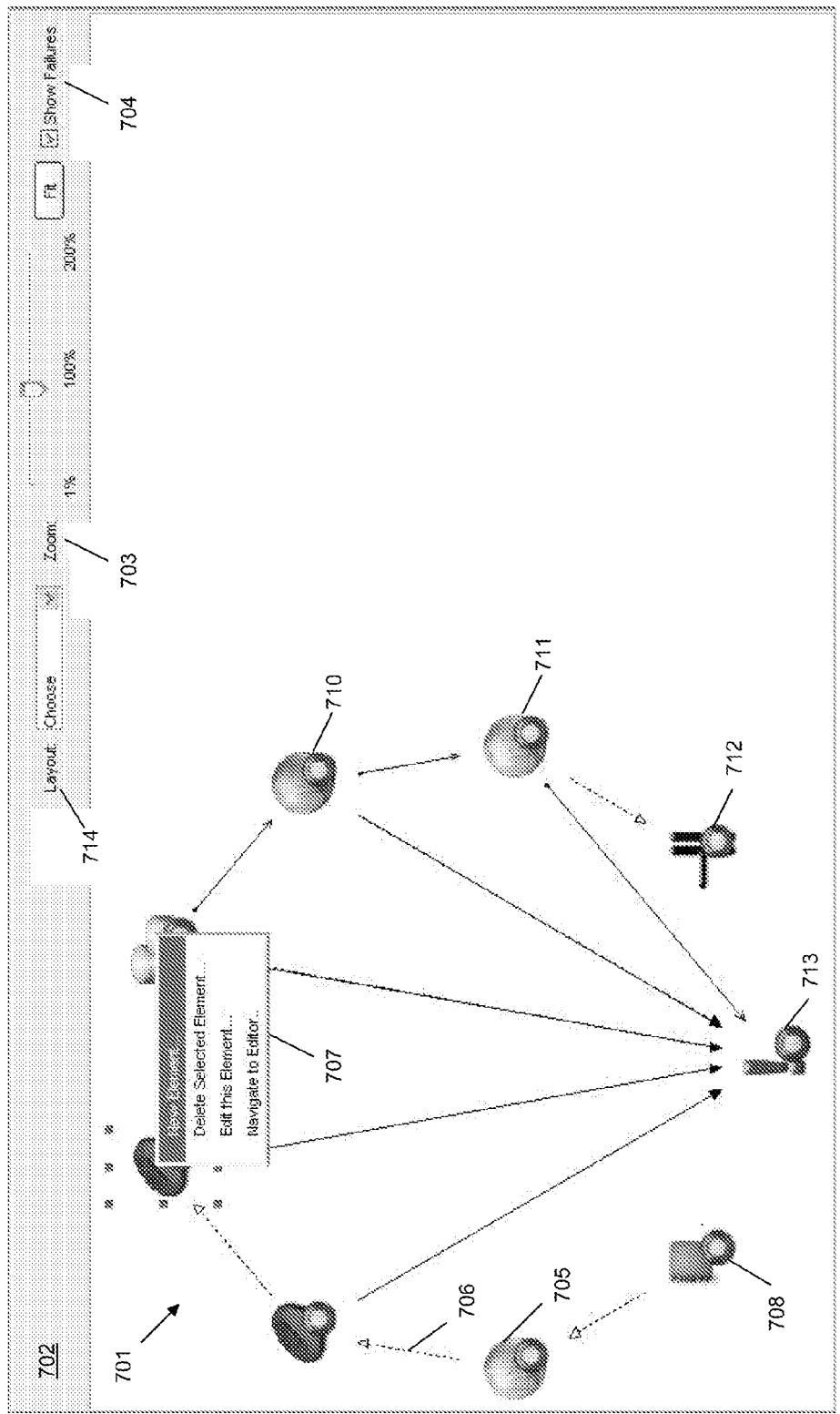
FIG. 7 is a screenshot illustrating an example of a prespecified view of a graphical model, according to one embodiment of the present invention.

Still other viewing options that can be provided by view menu 217 include layout options. The user interface can provide a variety of different algorithms for arranging graphical elements within a graphical model (e.g., such algorithms can control where the start node and/or failure nodes are located, for example). A user can select a particular layout from view menu 217. In response, the user interface will re-render the graphical model according to the algorithm associated with the selected layout. While each layout may show the same icons and connectors, the arrangement of those icons and connectors relative to each other (and to graphical model editing area 220) may vary among layouts. An example layout is shown in FIG. 7.

Model menu 218 provides a user with options to view the test case in different models. For example, when the user selects a graphical model option from model menu 218, the user interface will display graphical model editing area 220 and render a graphical model corresponding to the test case within that area. A user can select other models, such as the tree model shown in FIG. 3, for viewing a test case. If a user modifies the graphical model and then selects a different model, the user interface can prompt the user to save or commit the changes before switching models. If the user chooses to save the modifications, the new model will reflect the changes made by editing the graphical model.

Report menu 219 includes options usable to generate reports corresponding to the graphical model. Reports can include printouts (to screen or to a printer) that describe properties or results (e.g., captured data, error conditions encountered, log messages generated, response times, and the like) corresponding to the test case and/or test run (or a portion of the test case or test run) that is currently displayed and/or selected within graphical model editing area 220.

Figure 3:
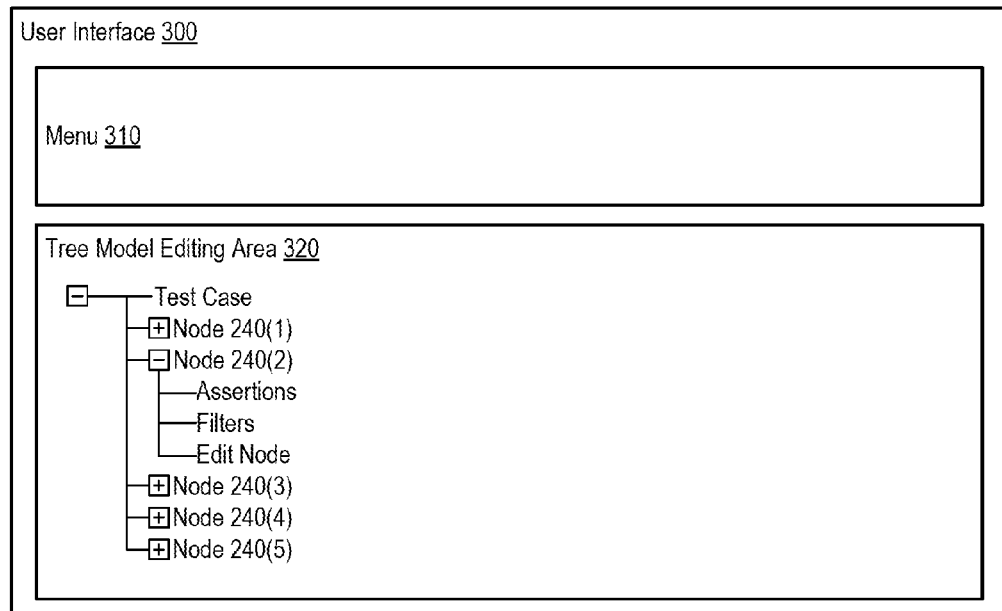
FIG. 3 is a block diagram of a user interface that displays a tree model of the test case shown in FIG. 2, according to one embodiment of the present invention.

FIG. 3 is a block diagram of a user interface 300 that displays a tree model of the test case shown in FIG. 2. User interface 300 includes a menu 310 (which may include several of the same options as menu 210) and a tree model editing area 320. In the tree view, nodes are arranged in a tree-like structure that can be expanded or contracted (e.g., selecting the "−" icon will cause details to be hidden, while selecting the "+" icon will cause additional details to be displayed). For example, the details associated with Node 240(2) have been expanded, showing options corresponding to assertions, filters, and node editing. While the view shown in FIG. 3 displays the same test case represented by the graphical model in FIG. 2, the view in FIG. 3 conveys much less information about, for example, how the test case will proceed under various conditions.

Figure 4A:
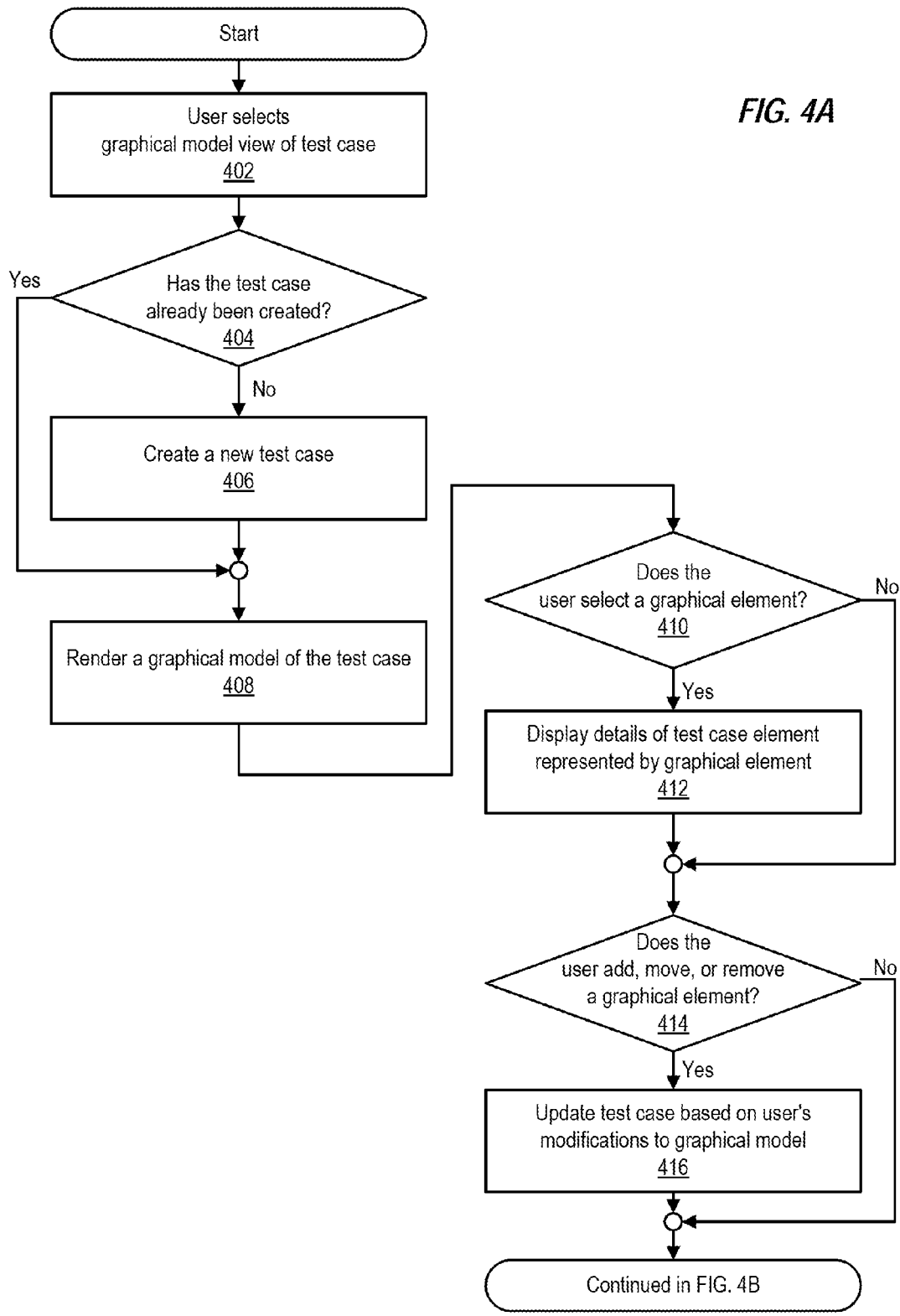
FIGS. 4A and 4B show a flowchart of a method of presenting a graphical model of a test case to a user for editing, viewing, and reporting, according to one embodiment of the present invention.
Figure 4B:
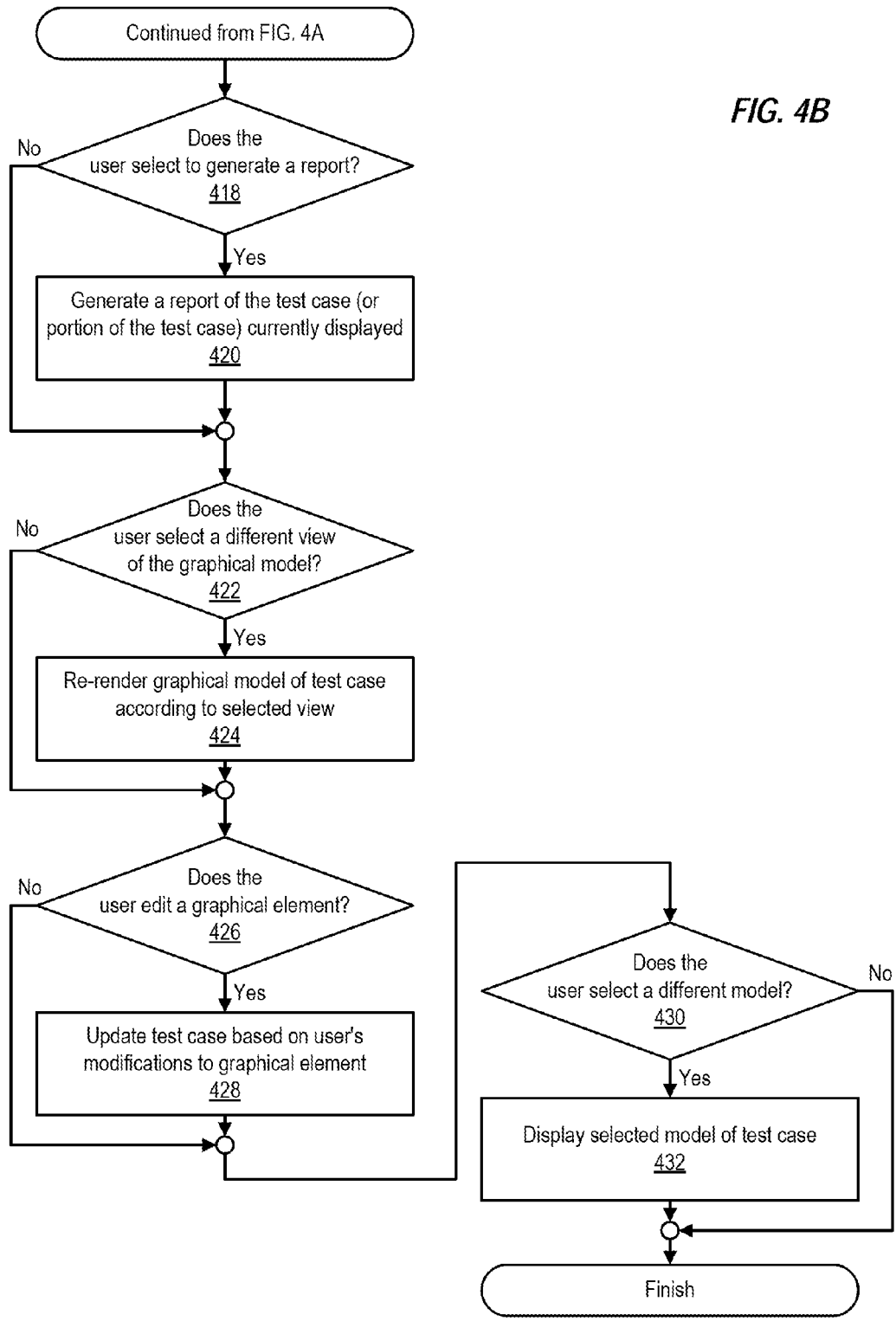

FIGS. 4A and 4B show a flowchart of a method of presenting a graphical model of a test case to a user for editing, viewing, and reporting. This method can be performed by graphical model renderer 26 and/or graphical model editing module 30 of FIG. 1.

Figure 5:
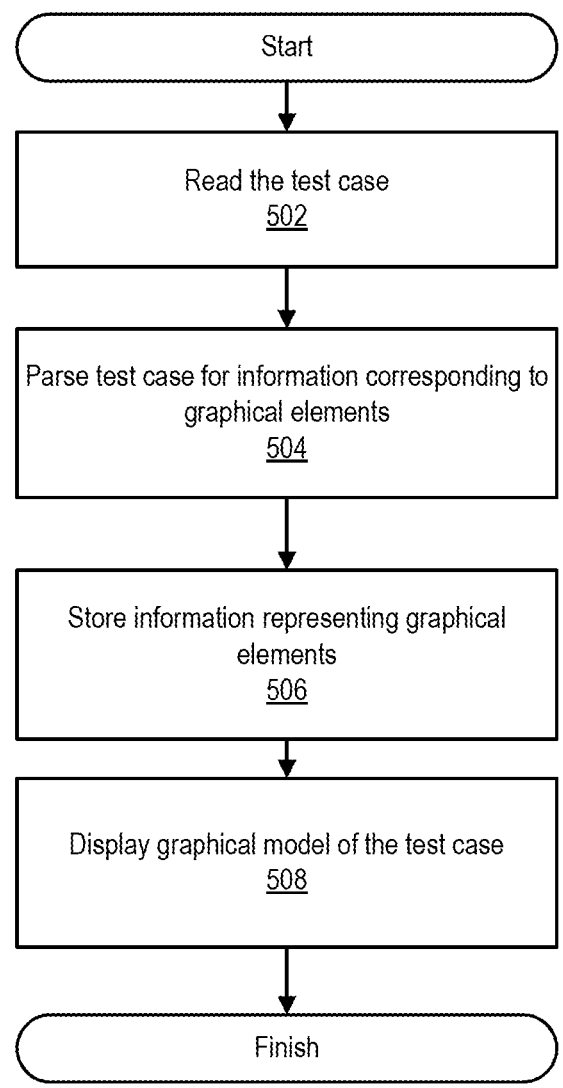
FIG. 5 is a flowchart of a method of rendering a graphical model of a test case, according to one embodiment of the invention.

The method begins at 402, when a user selects a graphical model view of a test case. If the test case has not already been created, as determined at 404, the test case is created, as shown at 406. A graphical model of the test case is then rendered, as shown at 408. FIG. 5 provides more details regarding how an existing test case can be rendered. For a new test case, the rendered graphical model may simply be a blank screen, if the user did not specify any test case components when creating the test case. Operations 402-408 can be performed, for example, by graphical model renderer 26 of FIG. 1.

The user can then modify the graphical model, or the user's view of the graphical model. The user can also select to see more details of a particular test case component represented within the graphical model. If the user selects (at 410) a graphical element of the graphical model, the user interface can display more detailed information about the test case element(s) represented by that graphical element, as shown at 412. For example, if a user selects an icon representing a node, the user interface can display information identifying how the node is configured. This information can include the node's name, type, default next node, as well as the activity performed by that node, properties used or captured by that node, and so on. The information can be displayed in a non-graphical-model format by a different module within the user interface (e.g., the information can be displayed by a form-based test case editor within the user interface). Thus, the graphical model can act as a graphical index into the other areas of the testing system that are used to edit, view, or generate reports corresponding to the test case represented by the graphical model.

If the user adds, moves, or removes a graphical element (at 414), the user interface will update the corresponding test case to reflect the modifications made to the graphical model, as shown at 416. For example, if the user moves a connector so that the connector points to a different node, the user interface will update an assertion and/or node within the test case to reflect this change. If the user adds or deletes an icon representing a node, the user interface will update the test case to include the new node or remove an existing node. The test case elements that can be edited by editing graphical elements within the graphical model can include test commands (e.g., as included in a node represented by an icon within the graphical model), assertions (e.g., as represented by a connection within the graphical model), parsing or processing commands (e.g., as included in a node or filter represented by an icon, text, or other adornments), or preferences and attributes of any of the foregoing (e.g., as represented by text or other adornments within the graphical model).

If the user selects to generate a report (at 418), the user interface will generate a report (at 420) corresponding to the test case elements represented by the selected or displayed portion of the graphical model. A report includes information describing the test case elements and/or the results obtained when executing the test case elements against the system under test. The report can, for example, show all the appropriate test case elements and their current attributes. A report can also include a graphical printout that is an approximate rendering of the graphical model displayed on the screen. A report can take the form of a graphic file, text, XML, printed output, or any other appropriate output format.

If the user selects a different view of the graphical model at 422, the user interface will re-render (if necessary) the graphical model (at 424) and display the graphical model according to the selected view, as shown at 242. A user can, for example, select to change the zoom of the graphical model, causing certain portions of the graphical model to be added or removed from the current display. If the user changes the layout of the graphical model, the graphical model can be re-rendered according to an algorithm associated with that layout. The re-rendered graphical model can provide a rearranged view of the graphical elements. If the user chooses to change the view by hiding or showing certain types of graphical elements (e.g., such as the icon representing failure node and connectors coupled to such a failure node), the appropriate graphical elements can be removed from or added to those currently displayed.

If the user edits a graphical element at 426, the user interface will update the test case (and any intermediate test case models) based on the user's modifications to the graphical element, as shown at 428. The user can edit a graphical element, for example, by adding, moving, or removing that element (e.g., at 414). The user can also edit a graphical element by selecting to view details corresponding to that graphical element (e.g., at 410) and then modifying one or more of those details. The user can also modify a graphical element by adding or removing text or other adornment associated with that element in the graphical model.

Finally, if the user selects a different model (other than the graphical model) of the test case, as determined at 430, the user interface will render the test case in the selected model, as shown at 432. Operations 410-430 can be repeated as long as the user continues to view the graphical model of the test case. It is noted that determinations 412, 414, 418, 422, 426, and 430 can be performed in a different order than shown in FIGS. 4A-4B (e.g., the user interface can simply perform these determinations as user input is received, such that if a user selects a different layout prior to selecting to add a new node, determination 422 can be made before determination 414). Additionally, other operations can be included instead of and/or in addition to those operations shown in FIGS. 4A-4B.

FIG. 5 is a flowchart of a method of rendering a graphical model of a test case. This method can be performed by, for example, graphical model renderer 26 of FIG. 1.

The method begins at 502, when test case is read into memory. The test case is then parsed in order to identify information corresponding to graphical elements that can be included in a graphical model, as shown at 504. Operation 504 can be performed by associating one or more test case elements with one or more graphical elements. Different types of test case elements can be associated with different types of graphical elements (e.g., in one embodiment, each test case node is represented by an icon, while each assertion is represented by a connector).

The test case is also scanned for information identifying interdependences between test case elements. These interdependencies can also be correlated with graphical elements. For example, if a node specifies a default next node, this information will be associated with a connector.

Thus, the test case can be scanned for all actions (e.g., as represented by nodes within the test case) performed and the relationships between all those actions. Each action may have a number of pre-conditions, test conditions, and post-conditions (e.g., as represented by nodes, filters, assertions, or other elements within the test case). For all of these actions, relationship, and conditions that can be represented by graphical elements, the graphical model renderer will identify the appropriate graphical element associated with the action, relationship, or condition.

Information generated by parsing the test case is stored as an intermediate model. In particular, operation 506 stores information representing the graphical elements identified by scanning the test case and the relationships between those graphical elements. In alternative embodiments, this operation is omitted (e.g., if there is a one-to-one correspondence between most test case elements and graphical elements, the test case itself provides this intermediate model).

At 508, the graphical model of the test case is displayed. The graphical model renderer will include all of the graphical elements identified at 504. These graphical elements will be arranged in a manner that corresponds to the relationships identified between elements of the test case. The graphical elements can also be arranged in a manner that accounts for any predefined user preferences (e.g., with respect to layout algorithm and show/hide options). After being rendered, the graphical model can be viewed, edited, and otherwise acted upon (e.g., for report generation) by the user. Once the user has completed interacting with the graphic model (e.g., as indicated by the user selecting a "save" menu option), any changes made to the graphical model can be applied to the underlying test case (and the intermediate model, if any).

Figure 6:
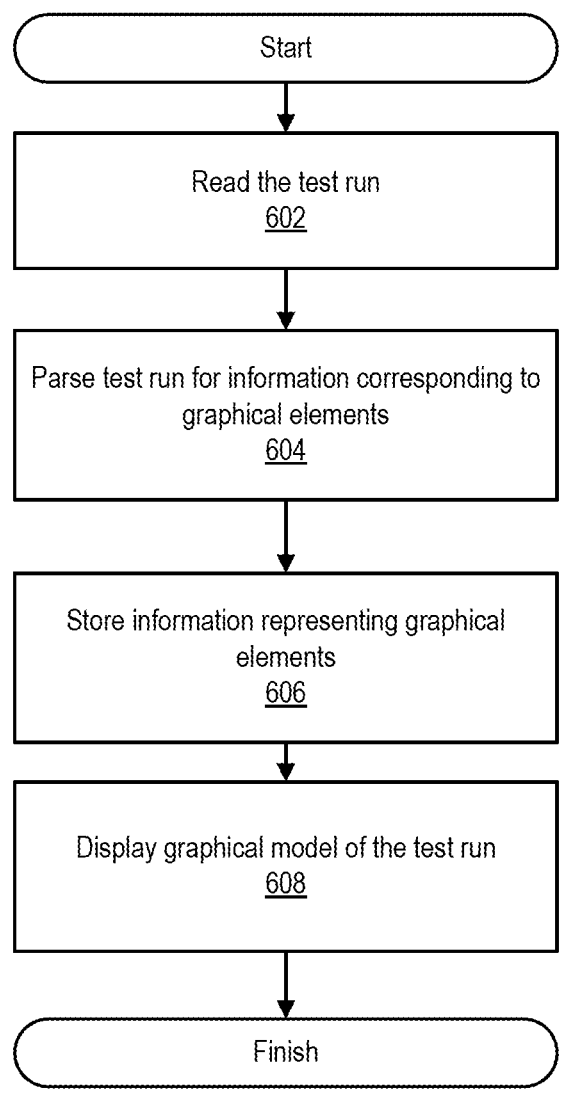
FIG. 6 is a flowchart of a method of rendering a graphical model of a test run, according to one embodiment of the invention.

FIG. 6 is a flowchart of a method of rendering a graphical model of a test run. A test run includes a test case as well as information obtained by actually executing the test case to test the system under test. A user can select to view a graphical model of a test run in order to easily see how the system under test actually performed when the test case was executed. This method can be performed by, for example, graphical model renderer 26 of FIG. 1.

The method begins at 602, when test run is read into memory. The test run can include a test case as well as test run data obtained by executing the test case against the system under test.

The test run is then parsed in order to identify information corresponding to graphical elements that can be included in a graphical model, as shown at 604. This operation can be performed in a manner similar to operation 504 of FIG. 5. Operation 604 can include the actions taken to perform operation 504, as well as actions needed to incorporate the test run data into the graphical model. For example, if certain nodes were not executed during the test run, graphical elements corresponding to those nodes can be omitted from the graphical model. Similarly, graphical elements corresponding to results captured during the test can be included in the graphical model of the test run.

Information identifying the graphical elements identified by parsing the test run is stored (e.g., as an intermediate model), as shown at 606. In alternative embodiments, this operation is omitted (e.g., if there is a one-to-one correspondence between most test run elements and graphical elements, the test run itself provides this intermediate model).

At 608, the graphical model of the test run is displayed. The graphical model renderer will include all of the graphical elements identified at 604. These graphical elements will be arranged in a manner that corresponds to the relationships identified between elements of the test run. The graphical elements can also be arranged in a manner that accounts for any predefined user preferences (e.g., with respect to layout algorithm and show/hide options). After being rendered, the graphical model can be viewed, edited, and otherwise acted upon (e.g., for report generation) by the user. Once the user has completed interacting with the graphic model (e.g., as indicated by the user selecting a "save" menu option), any changes made to the graphical model can be applied to the underlying test run (and the intermediate model, if any).

FIG. 7 is a screenshot illustrating an example of a prespecified layout of a graphical model. In this example, the graphical model is implemented according to an algorithm that places the icon 713 representing the failure node at the bottom of the display. The other nodes are arranged in a "Ferris wheel" arrangement, such that the icon 708 representing the first node of the test is presented in the bottom left of the display and the icon 712 representing the final node (the node that ends the test in success) is shown at the bottom right of the display.

As shown in FIG. 7, the graphical model is displayed in viewing area 701 (e.g., like graphical model editing area 220 of FIG. 2). Menu options 702 (e.g., similar to menu 210 of FIG. 1) are presented at the top of the display. Menu options 702 include layout options 714 a slide bar 703 for selecting zoom options, and a checkbox 704 to select whether to hide or show failure nodes (in this example, the failure node is shown).

Different icons are used to represent each node in the test case. As shown, one icon 708 represents the first node in the test. Icons 705, 710, and 711 represent nodes that generate web requests and/or web services requests. Another icon 709 is used to represent a node that tests an EJB. Yet another icon 712 represents a node that ends the test in success. Icon 713 represents the failure node.

In this example, the connections between nodes show the different paths that may be taken as the test is executed. Dashed lines with hollow arrowheads, such as connector 706, denote the typical or default next step of the test. Solid lines with a filled arrowhead (such as those leading to the failure node) represent assertions (e.g., as used to fail the test in the presence of certain error conditions).

A menu box 707 is displayed because a user has selected an icon within the graphical model. The menu box provides the user with options to add a new graphical element, to delete the selected element, to edit the selected element and to navigate to the appropriate editor for modifying the test case element(s) represented by the selected graphical element.

Returning to FIG. 1, it is noted that the program instructions and data implementing testing module 20, which includes graphical model renderer 26 and graphical model editing module 30, can be stored on various computer readable media such as memory 106. In some embodiments, testing module 20 are stored on a computer readable medium such as a CD (Compact Disc), DVD (Digital Versatile Disc), hard disk, optical disk, tape device, floppy disk, and the like). In order to be executed by processor 102, the instructions and data implementing testing module 20 are loaded into memory 106 from the other computer readable medium. The instructions and/or data implementing testing module 20 can also be transferred to computing device 10 for storage in memory 106 via a network such as the Internet or upon a carrier medium.

Although the present invention has been described in connection with several embodiments, the invention is not intended to be limited to the specific forms set forth herein. On the contrary, the present invention is intended to cover such alternatives, modifications, and equivalents as can be reasonably included within the scope of the invention as defined by the appended claims.

What is claimed is:

1. A method comprising:
   identifying particular test case data defining a particular test adapted to be performed on one or more software entities, the particular test including a plurality of test activities and a test flow of the plurality of test activities; and
   rendering the test case data, using at least one processor device, to generate a graphical model of the particular test, the graphical model adapted for presentation on a graphical display device and including:
   a first graphical element representing a first test activity in the plurality of test activities;
   a second graphical element representing a first test activity in the plurality of test activities; and
   a first connector coupling at least the first graphical element and the second graphical element and representing a first flow path in the test flow of the particular test from the first test activity to the second test activity.

2. The method of claim 1, wherein the graphical model is an interactive model adapted to be manipulated by a user interacting with the graphical display device.

3. The method of claim 2, further comprising:
   receiving a user interaction with the graphical model; and
   modifying the test case data based on the user interaction.

4. The method of claim 3, wherein the user interaction modifies the graphical model.

5. The method of claim 4, wherein the user interaction modifying the graphical model includes user input adding a new graphical element to the graphical model, wherein the new graphical element represents a third testing activity, and the test case data is modified, in response to the user interaction, to include a third test node configured to perform the third testing activity.

6. The method of claim 3, wherein the user interaction with the graphical model includes selection of the first graphical element, the method further comprising providing display of detailed information corresponding to the first testing activity in response to the user interaction.

7. The method of claim 3, further comprising updating display of the graphical model based at least in part on the user interaction.

8. The method of claim 1, wherein generating the graphical model includes parsing the test case data to correlate test case elements with graphical elements to be included in the graphical model.

9. The method of claim 8, wherein parsing the test case data includes identifying a type of test activity associated with each test element and the test elements are correlated to graphical elements of corresponding test activity types.

10. The method of claim 1 wherein the first connector represents the first flow path in connection with a first test condition; and the graphical model further includes:
a third icon representing a third testing activity of a third node in the plurality of nodes, and
a second connector coupling at least the first icon and the third icon, representing a second flow path, in connection with a second alternative test condition, from the first test activity to the third test activity.

11. The method of claim 10, wherein the first flow path corresponds to a default test flow and the second flow path corresponds to an alternate, test failure flow.

12. The method of claim 1, wherein the test case data, when executed by at least one processor device, causes the particular test to be performed on one or more software entities.

13. The method of claim 12, further comprising:
identifying a user interaction with the graphical model;
modifying the test case data based on the user interaction; and
causing the modified test case data to perform a modified version of the particular test.

14. The method of claim 1, further comprising:
causing the test case data to be executed to perform the particular test on a first software entity; and
providing a graphical representation of results of the particular test on the first software entity.

15. The method of claim 14, wherein the particular test included performance of the first test activity followed by the second test activity and the graphical representation of the results includes the first graphical element, the second graphical element, and the first connector coupling the first graphical element and the second graphical element.

16. The method of claim 15, further comprising:
causing the test case data to be executed to perform the particular test on a second software entity; and
providing a graphical representation of results of the particular test on the second software entity, the graphical representation of results of the particular test on the second software entity omitting at least one of the first graphical element, the second graphical element, and the first connector.

17. The method of claim 14, wherein the graphical representation of the results is presented in connection with the graphical model and includes a graphical effect corresponding to the first graphical element representing performance of at least the first test activity.

18. The method of claim 1, wherein identifying the particular test case data includes generating the particular test case data.

19. The method of claim 18, wherein generating the particular test case data includes:
receiving a request to add the first graphical element to a graphical model editing area;
adding first test data to the particular test case data, the first test data including logic for performing the first test activity on one or more software entities;
receiving a request to add a second graphical element to the model editing area;
adding the second test data to the particular test case data, the second test data including logic for performing the second test activity on one or more software entities;
receiving a request to add a graphical connector element between the first and second graphical elements in the model editing area; and
defining the flow path from the first test activity to the second test activity in the particular test case data.

20. An article comprising non-transitory, machine-readable media storing instructions operable to cause at least one processor to perform operations comprising:
identifying particular test case data defining a particular test adapted to be performed on one or more software entities, the particular test including a plurality of test activities and a test flow of the plurality of test activities; and
rendering the test case data to generate a graphical model of the particular test, the graphical model adapted for presentation on a graphical display device and including:
a first graphical element representing a first test activity in the plurality of test activities;
a second graphical element representing a first test activity in the plurality of test activities; and
a first connector coupling at least the first graphical element and the second graphical element and representing a first flow path in the test flow of the particular test from the first test activity to the second test activity.

21. A system comprising:
at least one processor device;
at least one memory element; and
a testing module, adapted when executed by the at least one processor device to:
identify particular test case data defining a particular test adapted to be performed on one or more software entities, the particular test including a plurality of test activities and a test flow of the plurality of test activities; and
render the test case data to present a graphical model of the particular test in a graphical user interface, the graphical model including:
a first graphical element representing a first test activity in the plurality of test activities;
a second graphical element representing a first test activity in the plurality of test activities; and
a first connector coupling at least the first graphical element and the second graphical element and representing a first flow path in the test flow of the particular test from the first test activity to the second test activity.

* * * * *